United States Patent [19]

Tienstra

[11] Patent Number: 4,729,571
[45] Date of Patent: Mar. 8, 1988

[54] SPINNER HITCH

[76] Inventor: Garrett R. Tienstra, Caloosa Estates Dr., LaBelle, Fla. 33935

[21] Appl. No.: 868,608

[22] Filed: May 30, 1986

[51] Int. Cl.⁴ .............................................. B60D 1/06
[52] U.S. Cl. .................................. 280/415 A; 280/504
[58] Field of Search ........... 280/511, 504, 512, 415 A; D12/162; 280/500

[56] References Cited

U.S. PATENT DOCUMENTS

| | | | |
|---|---|---|---|
| 2,872,213 | 2/1959 | Hosford | 280/511 X |
| 2,911,233 | 11/1959 | Riddle | 280/511 |
| 3,801,134 | 4/1974 | Dees | 280/415 A |
| 3,922,006 | 11/1975 | Borges | 280/511 |
| 4,022,490 | 5/1977 | Rocksvold | 280/500 |
| 4,248,450 | 2/1981 | McWethy | 280/415 A |
| 4,456,279 | 6/1984 | Dirck | 280/511 X |

Primary Examiner—John J. Love
Assistant Examiner—Mitchell J. Hill
Attorney, Agent, or Firm—Alfred E. Wilson

[57] ABSTRACT

The so-called spinner hitch is a centrally apertured quadrangle member adapted to be pivotally secured between spaced mounting frame members by a rod projecting through apertures in the frame members and through the central aperture through the quadrangle member. The quadrangle member has four spaced angularly related platforms to receive thrust transmitting balls of different sizes, or spaced apertured members to receive therebetween thrust transmitting clevises. The mounting frame members have locking blocks secured to their inside surfaces to engage the horizontal and vertical surfaces of the quadrangle member that is spaced oppositely from the thrust transmitting platform that is transmitting the load to restrain the quadrangle member from shifting angularly as forward or reverse thrust is exerted on the torque transmitting member by the pulling vehicle.

7 Claims, 1 Drawing Figure

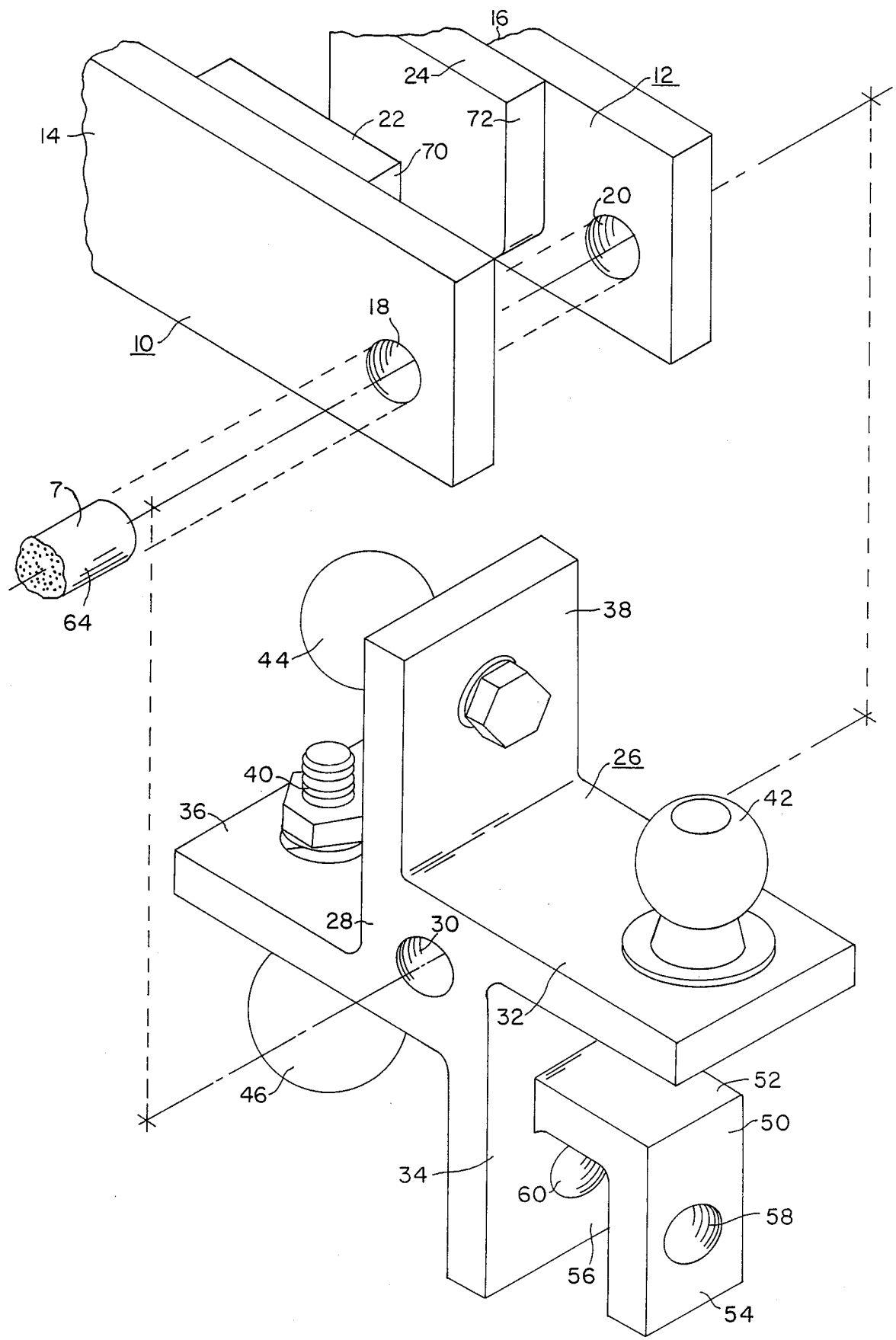

SPINNER HITCH

BACKGROUND OF THE INVENTION

The majority of thrust transmitting members are in the form of balls adapted to be clamped in female receptables to exert forward or reverse thrust on a load carrying vehicle. Several sizes of balls are employed dependent on the load to be transported. On occasion it is common practice for a pulling vehicle to engage and pull loads of varying sizes. It is therefore common practice for a vehicle to be equipped with several balls of different sizes. This necessitates the positioning of the balls laterally or vertically. The positioning of the line of thrust transversely or vertically is undesirable because the load bearing vehicle will not be properly positioned behind the pulling vehicle.

FIELD OF THE INVENTION

The field and purpose of this development is to provide a mulitiple thrust transmitting device wherein a plurality of thrust transmitting balls are centrally located, both laterally and vertically on a pulling vehicle so that the load carrying towed vehicle always properly tracks behind the pulling vehicle.

DESCRIPTION OF THE PRIOR ART

Various patents have heretofore issued on ball thrust transmitting members for hauling a loaded vehicle behind a pulling vehicle. None of these patents, insofar as is known, provide a plurality of thrust transmitting devices that can readily be changed to provide any of a plurality of devices that maintain the line of thrust in the center of the pulling vehicle, and at the proper elevation thereon.

The majority of the multiple drives that are available require that removal of one thrust transmitting ball and the replacement of a thrust transmitting ball of a different size.

SUMMARY OF THE INVENTION

I have devised the combination of a thrust transmitting device having four different sizes of thrust transmitting balls or other types of thrust transmitting devices all mounted in a single unit herein referred to as the Spinner Hitch to be fastened to the pulling vehicle. The Spinner Hitch is secured to the pulling vehicle by a rod projecting through spaced frame members and the apertured spinner hitch. The spaced frame members carried by the pulling vehicle have locking blocks which engage the horizontal and vertical surfaces of the segment of the spinner hitch that is opposite to the member transmitting the thrust to restrain the device from shifting angularly in use.

BRIEF DESCRIPTION OF THE DRAWINGS

The drawing is a perspective view showing the Spinner Hitch and the relation of the mounting frame and the locking blocks by which the spinner hitch is secured to the pulling vehicle.

DESCRIPTION OF THE PREFERRED EMBODIMENT

Referring now to the drawing two spaced apart flat bar members 10 and 12 have their front areas 14 and 16 secured to the frame of the pulling vehicle to which it is desired to attach the spinner hitch. Spaced apertures 18 and 20 are provided in the lower rear areas of the bars 10 and 12. Also spaced locking blocks 22 and 24 are secured as by welding to the insides of the bars 10 and 12 as illustrated.

The spinner hitch 26 has a quadrangle member having a hub 28 through which a horizontal aperture 30 extends. Four flat plate members 32, 34, 36, and 38 extend outwardly having their lower surfaces tangent to the aperture 30 through the hub 28. The plates 32, 34, 36 and 38 have thicknesses of approximately $\frac{3}{8}$" thick and approximately $1\frac{1}{2}$" wide, or thicker and wider if desired.

Each of the flat plate members 32, 34, 36 and 38 is provided with an aperture through which the threaded shanks 40 of thrust transmitting balls 42, 44 and 46 of graduated sizes project. The ball 42 is the smallest of the balls, being approximately $1\frac{7}{8}$" diameter, and ball numbers 46 is the largest and is approximately $2\frac{5}{8}$" in diameter. Balls between these ranges of dimensions are capable of providing approximately 90% of the need for thrust transmitting balls.

If desired a still different diametered thrust transmitting ball of larger or smaller diameter can be provided in the flat plate member 34 to provide a still greater spread of the desired ball diameters required to handle various loads.

As illustrated on the flat plate member 34 a different type of thrust transmitting member may be provided. In this instance a casting 50 having a wall 52 extending perpendicularly to the flat plate member 34 and terminating in a plate member 54 extends parallel with the wall 34 to provide therebetween a space 56 through which apertures 58 and 60 through the cast plate member 54 and the main plate member 34 may project for the reception of a bolt or pin having a head at one end and a nut or other fastener at the other end to confine a clevis in the space 56 behind the bolt. It will of course be understood that any other type of fastener such as a clevis pin and cotter pin may be used. It will be apparent that if desired the cast wall 52 extending outwardly from the wall 34 to support the plate member 54 may be dropped down from the flat plate member 32.

To assemble the spinner hitch 26 with the flat bar members 10, 12 carried by the pulling vehicle, the desired size of the ball 42, 44 and 46 or the other type of thrust transmitting device is selected, and the plate having the selected ball is positioned horizontally as shown in the drawing for the plate 32. Assuming that the ball 42 mounted on the plate member 32 is selected, the spinner hitch 26 is projected into the space between the bar members 10 and 12 of the pulling vehicle to such a point that its horizontal aperture 30 aligns with the apertures 18 and 20 in the bar members 10 and 12. The rod 64 is then projected through the aligned apertures 18, 30 and 20 and the caps or fasteners at opposite ends of the rod 64 are then secured in place on the ends of the rod 64 to securely lock it in place.

Attention is directed to the fact that the rear surfaces 70 and 72 of the locking blocks 22 and 24 align with the forward surface of the flat plate member 38 to prevent the spinner hitch 26 from shifting forwardly around the rod 64. In like manner the bottom surfaces of the locking blocks 22 and 24 engage the upper side edges of the upper surface of the flat plate member 36 to prevent the spinner hitch 26 from rotating forwardly in the clockwise direction around the rod 64.

The spinner hitch 26 is thus locked against rotation about the rod 64 in both directions whereupon the trailer vehicle having the load thereon can be pulled forwardly by the pulling vehicle, or it can be moved in the reverse direction by backing up the pulling vehicle to move the loaded vehicle in the reverse direction.

The spinner hitch 26 can be rotated to position whichever thrust transmitting ball or clevis that it is desired to employ, and the bar members 10 and 12 align on opposite sides of the spinner hitch 26 to align the apertures 18, 30 and 20 for the reception of the rod 64. The thrust transmitting hitch 26 thus aligns with the bar members 10 and 12 of the pulling vehicle to always maintain the thrust transmitting member in the center of the pulling vehicle, and at the same verticle elevation with respect thereto.

I claim:

1. A quadruple trailer hitch to secure various trailers having differently sized connectors to a pulling vehicle having spaced aperture parallel bar members having locking blocks, comprising a horizontally apertured spinner hitch having quadruple angularly related plates, ball connectors having balls of different diameters secured to a plurality of said plates, and a rod to project horizontally through the apertured bar members and the horizontal spinner hitch member to secure the spinner hitch member to the parallel bar members, the locking blocks on the parallel bar members engaging two of the angularly related plates of the spinner hitch member to restrain the spinner member from rotational movement.

2. The invention defined in claim 1 wherein one of the quadruple plates has a clevis type thrust transmitting member.

3. In a thrust transmitting mechanism, thrust transmitting spaced apart apertured parallel bar members having confronting surfaces and locking blocks fixed to the confronting surfaces, a spinner hitch having a horizontally apertured central hub between the parallel apertured bar members, a horizontal rod through the spinner and bar members, the spinner having four flat walls each bounded by angularly related horizontal and vertical walls mounted between the apertured parallel members and receiving the locking blocks fixed to the confronting surfaces to restrain the spinner hitch from rotating when thrust is exerted on the thrust transmitting parallel bar members.

4. The invention defined in claim 3 wherein a pair of the thrust transmitting members carried by the spinner hitch are thrust transmitting ball members of different diameters.

5. The invention defined in claim 4 wherein the smallest of the thrust transmitting ball members is approximately 1⅞" diameter and the largest of the thrust transmitting ball members is approximately 2⅝" diameter.

6. The invention defined in claim 3 wherein one of the thrust transmitting members carried by the spinner hitch is of the clevis type.

7. A spinner hitch to secure various trailers having differently sized ball receptacles to a pulling vehicle having spaced horizontally apertured parallel bar members having confronting surfaces and locking blocks secured to the confronting surfaces, comprising an apertured spinner hitch having a plurality of angularly related plates each having a ball of a different diameter, the angularly related plates being engaged by the locking blocks when in the operative position to restrain undesired angular movement of the spinner hitch.

* * * * *